(12) United States Patent  (10) Patent No.: US 7,516,344 B2
Kato et al.  (45) Date of Patent: Apr. 7, 2009

(54) MEMORY SYSTEM

(75) Inventors: Yoshihisa Kato, Otsu (JP); Yasushi Gohou, Ibaraki (JP); Masahiro Nakanishi, Yawata (JP); Masayuki Toyama, Neyagawa (JP); Shunichi Iwanari, Souraku-gun (JP)

(73) Assignee: Panasonic Corporation, Osaka (JP)

( * ) Notice: Subject to any disclaimer, the term of this patent is extended or adjusted under 35 U.S.C. 154(b) by 533 days.

(21) Appl. No.: 11/338,770

(22) Filed: Jan. 25, 2006

(65) Prior Publication Data

US 2006/0195708 A1 Aug. 31, 2006

(30) Foreign Application Priority Data

Jan. 28, 2005 (JP) ............................. 2005-021466

(51) Int. Cl.
G06F 1/00 (2006.01)
G06F 1/26 (2006.01)
G06F 13/00 (2006.01)
G06F 13/28 (2006.01)
G11C 16/04 (2006.01)
G11C 15/00 (2006.01)

(52) U.S. Cl. ........................ 713/322; 713/300; 711/103; 711/107; 365/185.33; 365/49.13

(58) Field of Classification Search ................. 713/322; 365/185.33, 49.13; 711/103, 107
See application file for complete search history.

(56) References Cited

U.S. PATENT DOCUMENTS

| 6,084,812 A | 7/2000 | Joo | |
| 6,564,288 B2* | 5/2003 | Olarig et al. | 711/105 |
| 7,064,994 B1* | 6/2006 | Wu | 365/211 |
| 7,124,052 B2* | 10/2006 | Oh | 702/132 |
| 7,395,176 B2* | 7/2008 | Chung et al. | 702/132 |
| 2004/0184303 A1 | 9/2004 | Manabe | |
| 2005/0050261 A1* | 3/2005 | Roehr et al. | 711/103 |
| 2006/0143371 A1* | 6/2006 | Rudelic et al. | 711/106 |

FOREIGN PATENT DOCUMENTS

JP 5-314754 11/1993

(Continued)

OTHER PUBLICATIONS

English language translation of JP 5-314754, Nov. 26, 1993.

(Continued)

*Primary Examiner*—Thomas Lee
*Assistant Examiner*—Stefan Stoynov
(74) *Attorney, Agent, or Firm*—Greenblum & Bernstein, P.L.C.

(57) ABSTRACT

A memory system of the present invention includes a memory device having a nonvolatile memory and an access device which accesses the memory device. The memory device has a detection unit to detect a temperature of the memory device, a determination unit to determine an operating condition in accordance with the detected temperature and a notification unit to notify the access device of the determined operating condition. The access device has an interface unit to connect to the memory device and a controlling unit to control the interface unit in accordance with the notified operating condition from the memory device.

10 Claims, 17 Drawing Sheets

FOREIGN PATENT DOCUMENTS

| | | |
|---|---|---|
| JP | 07-219720 | 8/1995 |
| JP | 07-320018 | 12/1995 |
| JP | 10-260911 | 9/1998 |
| JP | 10-307749 | 11/1998 |
| JP | 2001-142774 | 5/2001 |
| JP | 2003-67242 | 3/2003 |
| JP | 2003-316470 | 11/2003 |

OTHER PUBLICATIONS

English language translation of JP 10-260911, Sep. 29, 1998.
English language translation of JP 2003-316470, Nov. 7, 2003.
English language translation of JP 2003-67242, Mar. 7, 2003.
English language translation of JP 10-307749, Nov. 17, 1998.
English language Abstract of JP 2001-142774, May 25, 2001.
English language Abstract of JP 07-219720, Aug. 18, 1995.
English language Abstract of JP 07-320018, Dec. 8, 1995.

* cited by examiner

FIG. 5

| OPERATING TEMPERATURE | OPERATING VOLTAGE |
|---|---|
| -40°C ~ -20°C | 2.2V |
| -20°C ~ 10°C | 2.0V |
| 10°C ~ 85°C | 1.8V |

FIG. 8

| OPERATING TEMPERATURE | TRANSMISSION CLOCK RATE |
|---|---|
| -40°C ~ -20°C | 0.6MHz |
| -20°C ~ 10°C | 0.8MHz |
| 10°C ~ 85°C | 1MHz |

FIG. 13

| OPERATING TEMPERATURE | TRANSMISSION LATENCY |
|---|---|
| -40°C ~ -20°C | 3 |
| -20°C ~ 10°C | 2 |
| 10°C ~ 85°C | 1 |

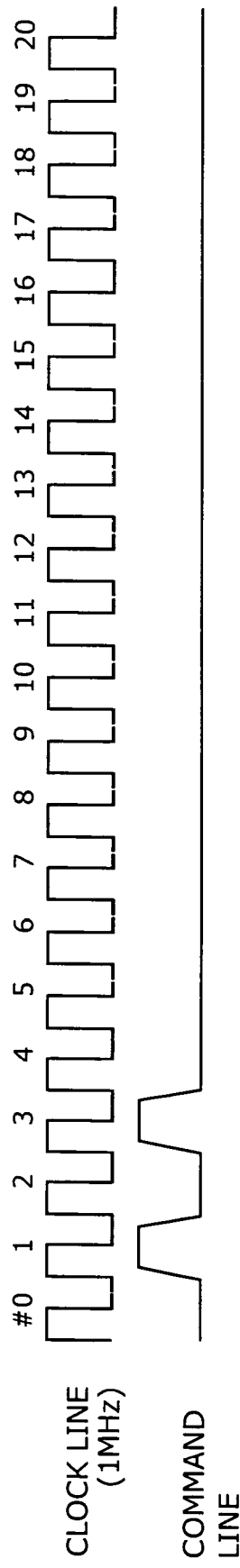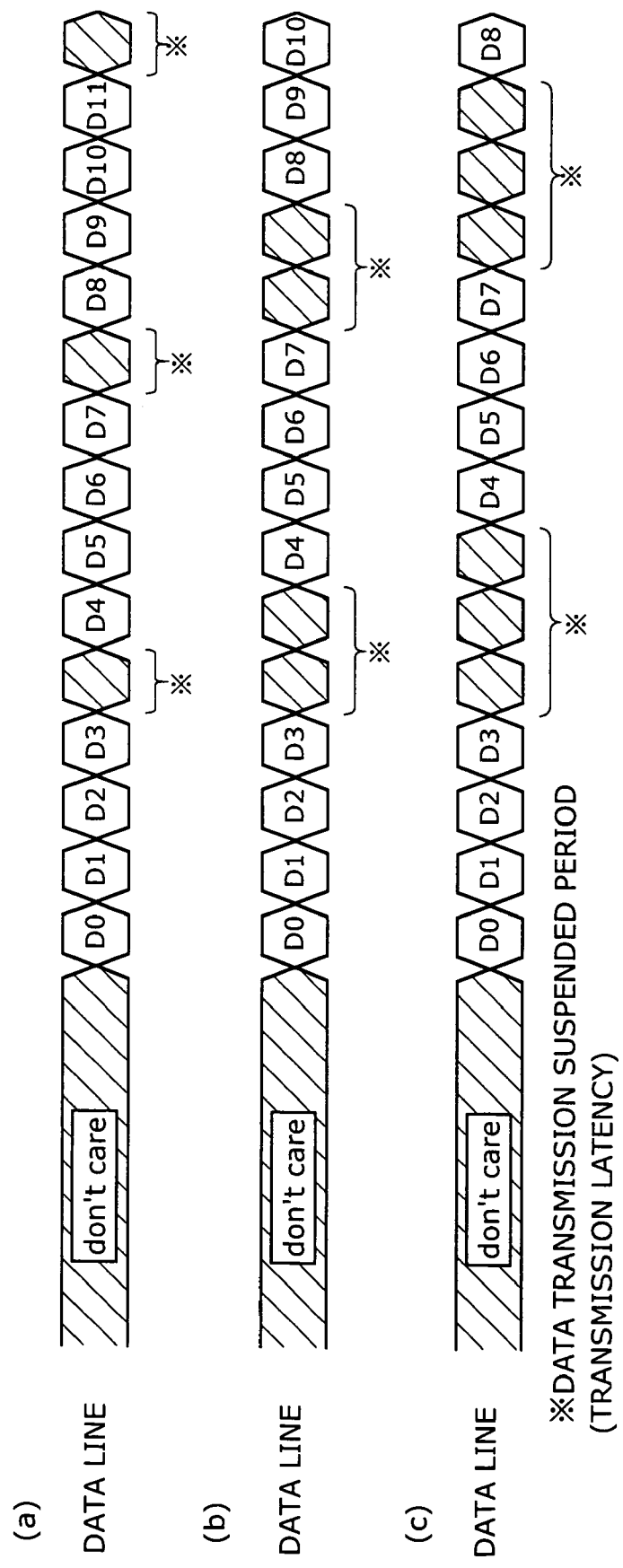
FIG. 14
※DATA TRANSMISSION SUSPENDED PERIOD (TRANSMISSION LATENCY)

MEMORY SYSTEM

BACKGROUND OF THE INVENTION (1) Field of the Invention

The present invention relates to a memory system which includes a memory device having a nonvolatile memory, and an access device for accessing the memory device.

(2) Description of the Related Art

A memory system (nonvolatile memory system), which includes a removable memory device having a nonvolatile memory, and an access device for accessing the memory device, is known for an example in Japanese Laid-Open Patent No. 2001-142774. The configuration of the memory system is shown in FIG. 1.

A memory card 500, which has a rewritable FLASH Electrical Erasable Programmable Read Only Memory (EE-PROM) 501, contains a controller 502. The controller 502 converts a logical address, which has been sent from a host device 550 for accessing FLASH EEPROM, into a physical address. The physical address is used for writing/reading data to/from the FLASH EEPROM 501. Address management information for converting the logical address is retained in a management area in the FLASH EEPROM 501, and then a necessary part of the address management information to access a requested address is read out and sent to a Static Random Access Memory (SRAM) 506.

According to the memory card 500 of the aforesaid conventional configuration, the following processing is necessary: the address management information is sent from the FLASH EEPROM 501 to the SRAM 506 at the start of an operation; and then the updated address management information is sent from the SRAM 506 to the FLASH EEPROM 501 at the end of the operation.

As an alternative to the aforesaid conventional configuration, it has been suggested in Japanese Laid-Open Patent No. H07-219720 that the address management information is retained in a nonvolatile RAM instead of the volatile SRAM 506. The configuration of the memory system is shown in FIG. 2. A ferroelectric memory and the like are used for a nonvolatile RAM 606.

This exemplified configuration shown in FIG. 2 enables to skip steps for sending address management information at the start and the end of the operation, so that the processing time at the time of inserting/removing a memory card 600 into/from the host device 550 can be reduced.

SUMMARY OF THE INVENTION

However the performances of the controller 502 and the nonvolatile RAM 606 which are semiconductor integrated circuit devices fluctuate depending on operating environments. Therefore, there exists a problem that accessing data requested by a host device is not able to be executed depending on operating environments.

More particularly, the nonvolatile RAM 606 contained in the controller 502 is easily affected by operating temperature. In fact the lowest operating voltage varies depending on the operating temperature as shown in FIG.3. The reason of the fact is that a capability to retain data during a power-off mode after data is written in the ferroelectric (known as retention characteristic) deteriorates when the temperature is relatively low. Especially in the case that memory cell is highly integrated, the memory cell whose lowest operating voltage is higher than the typified example shown in FIG. 3 is involved in a memory cell array undesirably with a certain rate due to piece-to-piece variations in manufacturing. In the case where such lowest operating voltage at a low temperature of the memory cell exceeds the driving voltage applied to the ferroelectric memory, the data retained in the memory cell is eliminated with time. As a result, there exists a problem that accessing data requested by the host device is not able to be executed depending on operating environments.

In view of the aforesaid problem, an object of the present invention is to provide a memory system which is capable of implementing a stable operation in the case where the performances of a ferroelectric memory and the like fluctuate depending on the temperature.

In order to solve the aforesaid problem, the memory system of the present invention includes a memory device which has a nonvolatile memory and an access device which accesses the memory device. The memory device includes a detection unit to detect a temperature of the memory device, a determination unit to determine an operating condition depending on the detected temperature and a notification unit to notify the access device of the determined operating condition. The access device includes an interface unit to connect to the memory device, and a controlling unit to control the interface unit in accordance with the operating condition notified by the memory device.

According to this configuration, the access device controls the interface with the memory device in accordance with the operating condition on the basis of the temperature, so that the stable operation can be implemented. More specifically, in the case where the memory device includes a ferroelectric memory, a power supply voltage is changed depending on the temperature, so that a deterioration of the retention characteristic can be prevented.

Here, the operating condition may represent a power supply voltage, and the controlling unit may control the power supply voltage to be applied to the memory device from the interface unit.

According to this configuration, in the case where the lowest operating voltage of the memory device varies depending on the temperature, it is possible to control the power supply voltage applied to the memory device so as to exceed the lowest operating voltage of the memory device on a constant basis.

Here, the operating condition may represent a data transmission rate, and the controlling unit may control the data transmission rate between the interface unit and the memory device.

According to this configuration, the interface unit controls the data transmission rate, so that a fluctuation of the performance of the memory device can be prevented.

Here, the data transmission rate may represent a rate of a clock signal, and the controlling unit may control the rate of the clock signal to be applied from the interface unit to the memory device.

According to this configuration, the interface unit controls the clock signal, so that a fluctuation of the performance of the memory device can be prevented by changing an access rate to the memory device.

Here, the data transmission rate may represent one of waiting clock counts or transmission data latency, which is interposed between transmission data, and the controlling unit may control one of the waiting clock counts or the transmission data latency.

According to this configuration, the amount of the suspended period for accessing the memory device is changed, so that the fluctuation of the performance of the memory device caused by the temperature changes can be prevented.

Here, the memory device may further include a ferroelectric memory and a flash Electrical Erasable Programmable Read Only Memory (EEPROM), and the ferroelectric memory may store information for managing an address of the flash EEPROM.

According to this configuration, the rewritable cycles ($10^{10}$ to $10^{12}$ cycles) of the ferroelectric memory to store the address management information is more than 100,000 times as large as the rewritable cycles ($10^4$ to $10^5$ cycles) of the FLASH EEPROM used as a nonvolatile memory, so that the reliability to the memory system can be improved.

In addition, the memory system of the present invention includes a memory device which has a nonvolatile memory and an access device which accesses the memory device. The memory device includes a detection unit to detect a temperature of the memory device and a notification unit to notify the access device of the detected temperature. The access device includes a determination unit to determine an operating condition depending on the notified temperature, an interface unit to connect the memory device and a controlling unit to control the interface unit in accordance with the operating condition notified by the memory device.

According to the memory system of the present invention, a stable operation can be implemented irrespective of the change of the operating environment.

FURTHER INFORMATION ABOUT TECHNICAL BACKGROUND TO THIS APPLICATION

The disclosure of Japanese Patent Application No. 2005-21466 filed on Jan. 28, 2005 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the Drawings:

FIG. 5 is a table showing a relation ship between an operating environment and an operating condition;

FIG. 8 is a table showing a relationship between an operating environment and an operating condition;

FIG. 13 is a table showing a relationship between an operating environment and an operating condition of a third embodiment;

FIG. 14 is a diagram showing a communication pulse between the host device and the memory card;

DESCRIPTION OF THE PREFERRED EMBODIMENTS

First Embodiment

Hereafter a memory system 1 of a first embodiment for the present invention will be described referring to diagrams.

Figure 4:
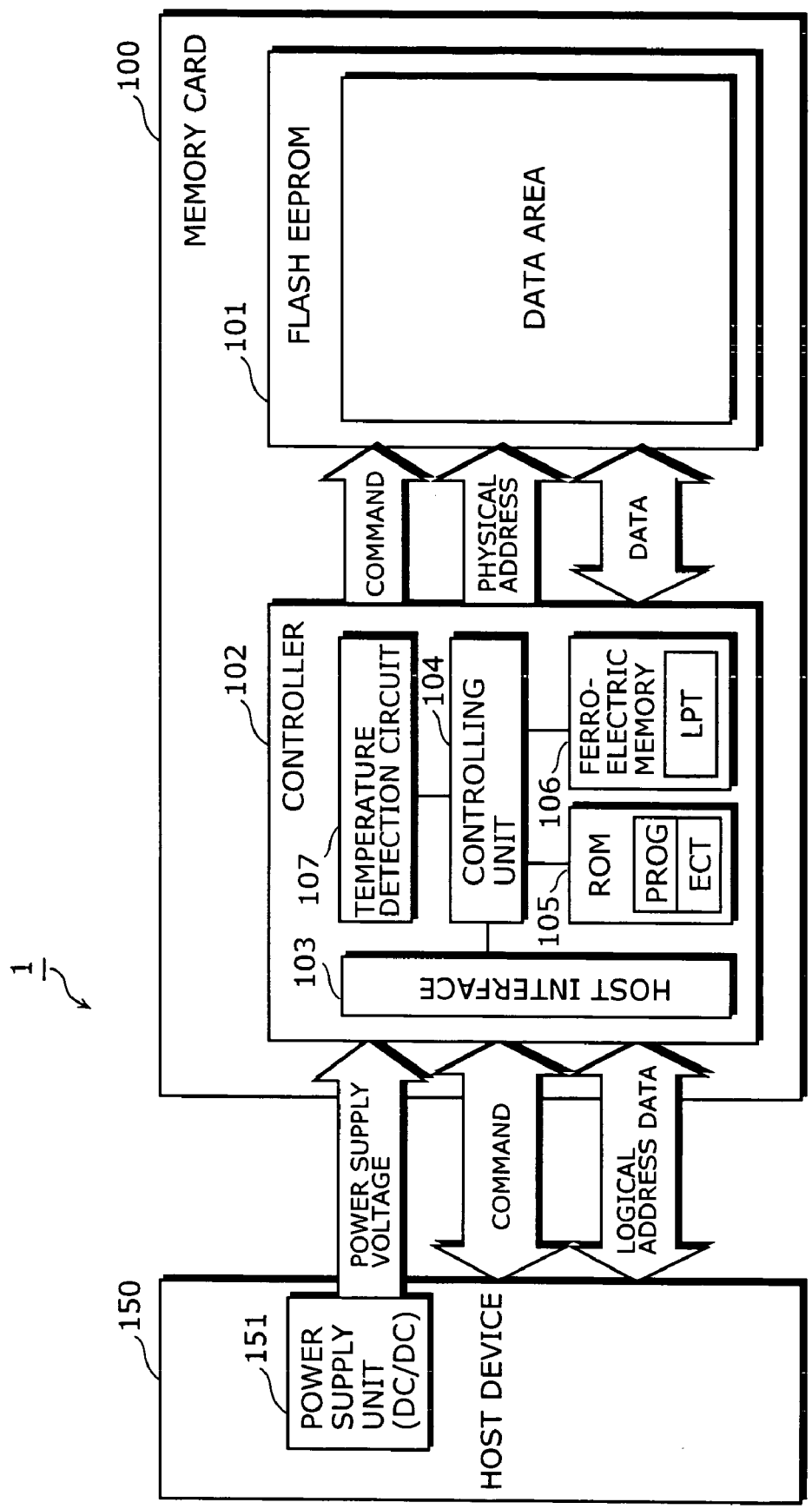
FIG. 4 is a block diagram showing a memory system of a first embodiment.

FIG. 4 is a block diagram showing the memory system of the first embodiment. The memory system 1 includes a memory card 100 and a host device 150. The memory card 100 is removable from the host device 150. The memory card 100 has a FLASH EEPROM 101 for storing data and a controller 102 for controlling data communication between the FLASH EEPROM 101 and the host device 150. The controller 102 is a semiconductor device having a host interface 103, a controlling unit 104, an ROM 105, a ferroelectric memory 106, and a temperature detection circuit 107. The operations of the respective components configuring the controller 102 will be described hereafter.

The host interface 103 converts the data format conforming to a communication protocol used for the data communication between the host interface 103 and the host device 150 into/from the data format in the controller 102. The power supplied from the host device 150 is distributed to the respective components in the memory card 100 through the host interface 103.

In the case where the host device 150 requests an access, the controlling unit 104 converts a logical address into a physical address of the FLASH EEPROM 101, and then executes the access to the FLASH EEPROM 101.

Figure 1:
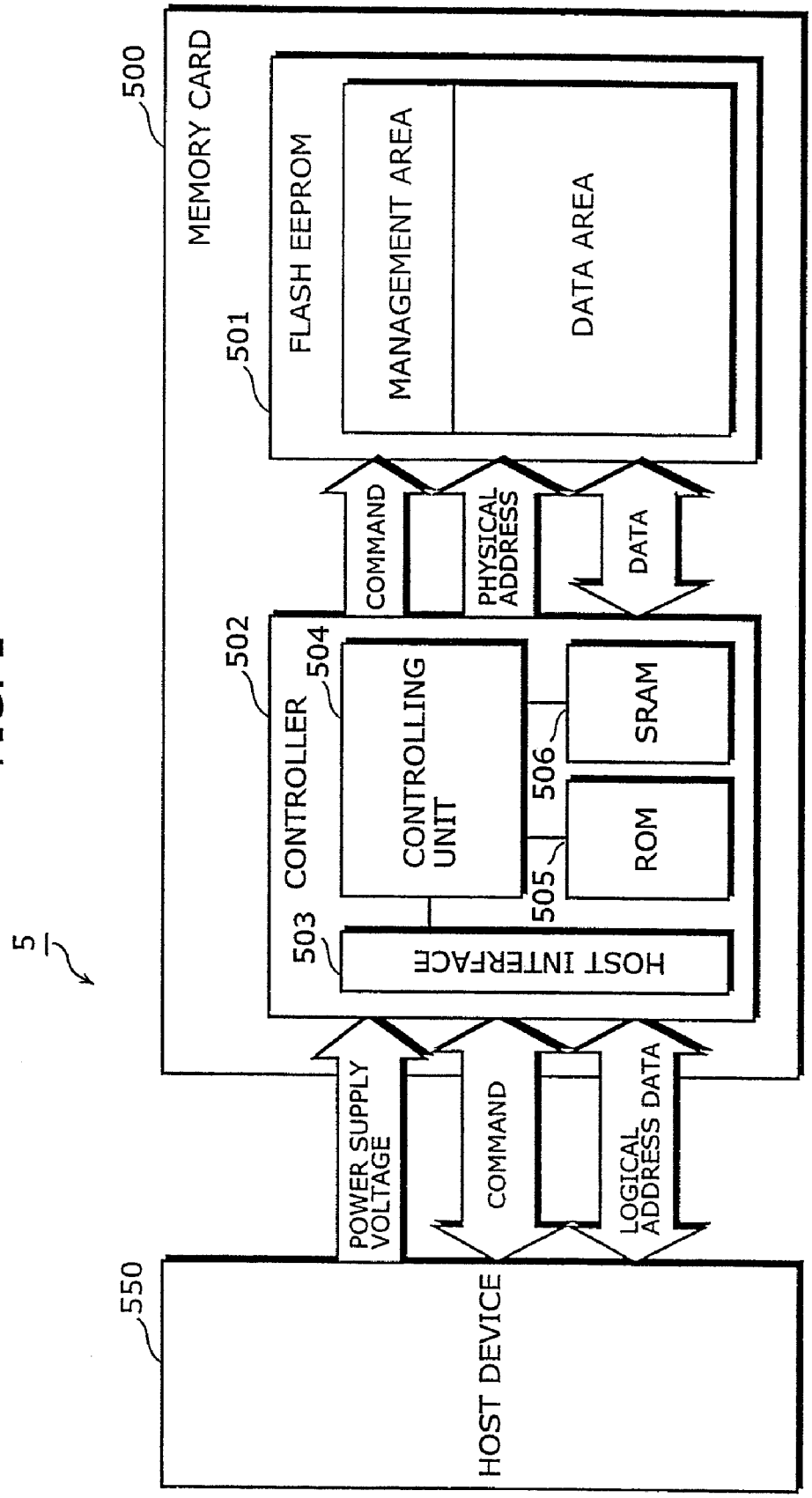
FIG. 1 is a block diagram showing a conventional memory system.
Figure 2:
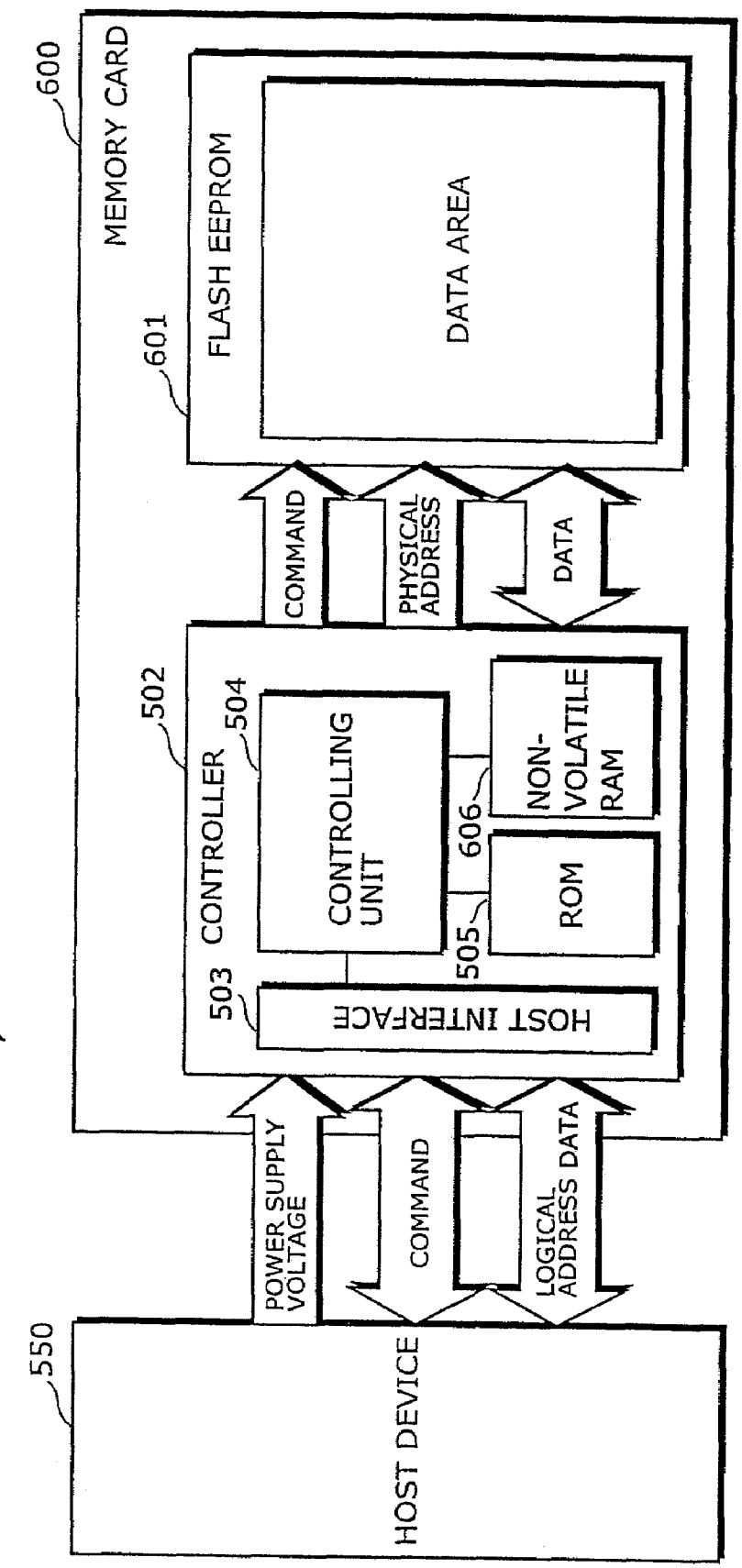
FIG. 2 is a block diagram showing a conventional memory system.
Figure 3:
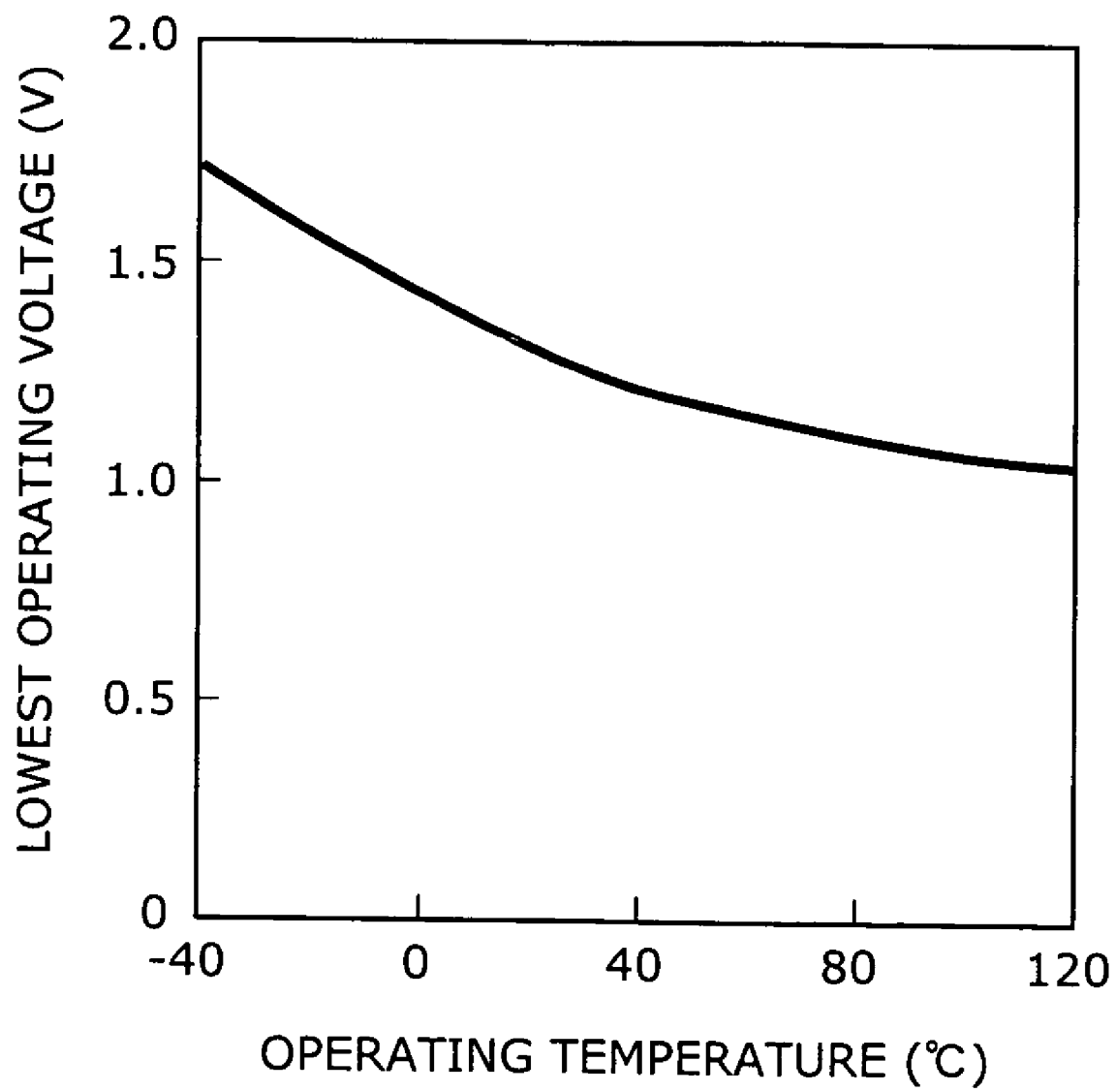
FIG. 3 is a graphical diagram showing a relationship between an operating temperature and an operating voltage of a ferroelectric.

The ROM 105 stores an operating program PROG of the controlling unit 104 and an Environment Condition Table (ECT) indicating a relationship between an operating environment and an operating condition. FIG. 5 is a table showing an example of the table ECT. The relationship between the operating temperature and the lowest operating voltage in the ferroelectric memory 106 is shown in FIG. 3 as mentioned above. The table ECT in FIG. 5 shows the temperatures and the corresponding power supply voltages, and the table satisfies the relationship between the temperatures and the power supply voltages shown in FIG. 3. For example in the case where the operating temperature ranges from 85° C. to 10° C., the corresponding power supply voltage is 1.8 V.

The ferroelectric memory 106 stores a Logical address/ Physical address conversion table (LPT) to which the controlling unit 104 refers.

The temperature detection circuit 107 measures the environment temperature of the memory card 100. For example the temperature detection circuit 107 contains a diode, monitors the current I flowing through the diode, and sends the value of the flowing current to the controlling unit 104.

The controlling unit 104 calculates a temperature T based on the equation $I=Is * \exp(V/kT)$, which represents flowing current through the diode. Note that Is denotes a saturation current, V denotes an applied voltage and k denotes the Boltzmann constant. The controlling unit 104 calculates an operating condition corresponding to the calculated temperature T using the table ECT stored in the ROM 105, and the calculated operating condition is requested to the host device 150 through the host interface 103.

The host device 150 has a power supply unit 151 which supplies a power supply voltage to the memory card 100, accesses the memory card 100 using the logical address, and adjusts a DC-DC converter contained in the power supply unit 151, so as to set up the power supply voltage to the memory card 100.

Figure 6:
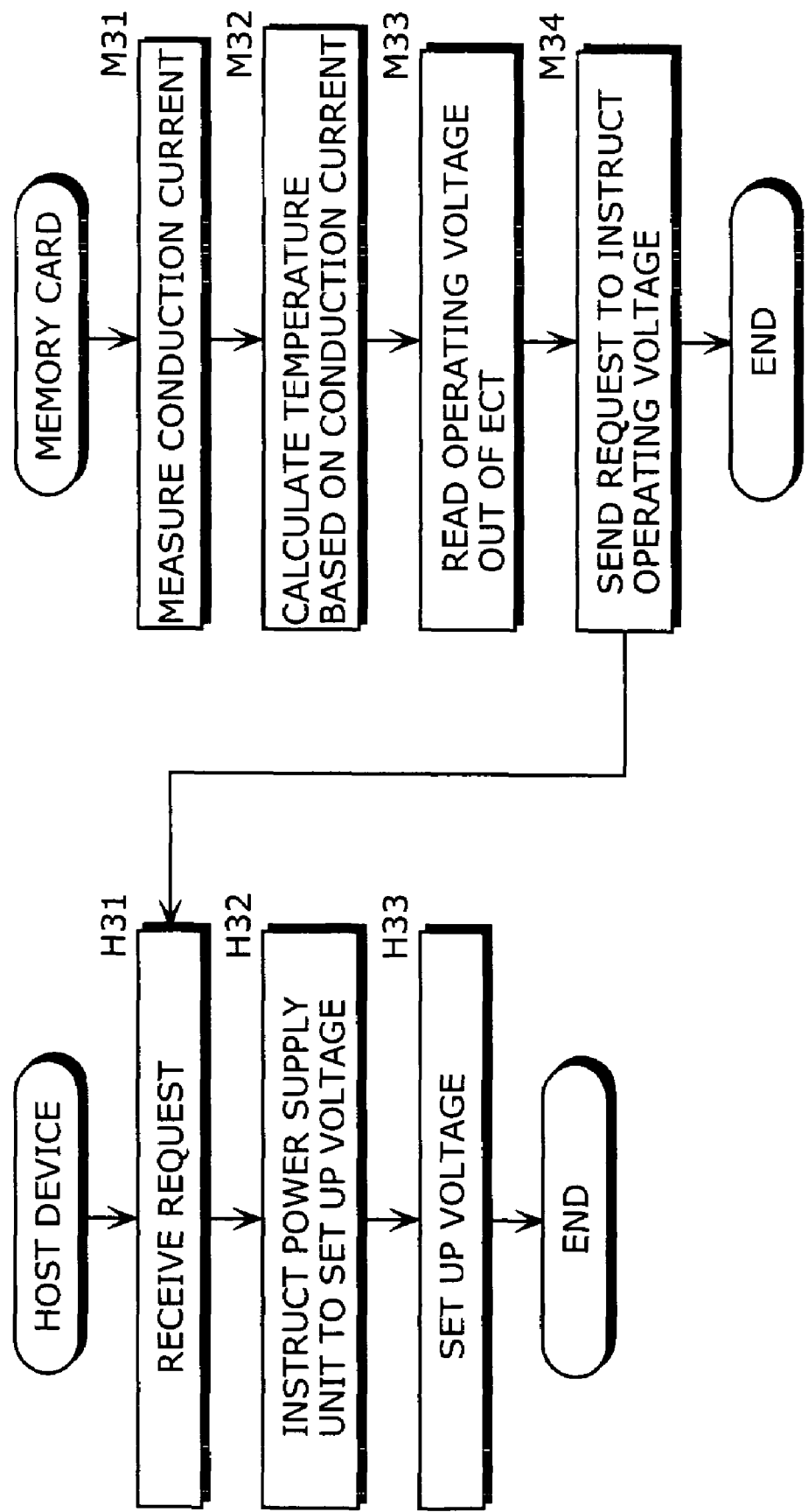
FIG. 6 is a flowchart showing the memory system operation.

FIG. 6 is a flowchart showing a processing to respond to the environment temperature in the memory card 100 and the host device 150. The memory card 100 performs following operations at each time of inserting the memory card 100 into the host device 150 and supplying power to the host device 150 into which the memory card 100 has been inserted, and being a state that the memory card 100 is inserted on a periodic basis. Firstly in the memory card 100, the temperature detection circuit 107 measures a current I flowing through the diode inside (M31). And then the controlling unit 104 calculates a temperature T based on the flowing current I (M32), reads an operating voltage corresponding to the temperature T out of the table ECT stored in the ROM 205 (M33), and transmits a request instructing the host device 150 on the operating voltage (M34). The host device 150 receives the request from the memory card 100 (H31), and then instructs the power supply unit 151 to set the requested voltage (H32). The power supply unit 151 sets up the voltage to be applied to the memory card 100 based on the instruction (H33).

Accordingly the host device 150 changes the power voltage applied to the memory card 100 based on the requested operation condition. For example in the case where the detected temperature decreases to −15° C., the controller 102 requests the host device 150 to change the power supply voltage to 2.0 V, and then the host device 150 changes the power supply to the memory card 100 to 2.0 V. In the case where the detected temperature decreases to −30° C., the controller 102 requests the host device 150 to change the power supply voltage to 2.2 V, and then the host device 150 changes the power supply to the memory card 100 to 2.2 V. The driving voltage to be applied to the ferroelectric memory 106 is also changed based on the change of the power supply, and the retention characteristic can be maintained irrespective of the change of the environment temperature.

Since the ferroelectric memory 106 stores the address management information, the number of data writings to the ferroelectric memory 106 is about 10,000 times as large as the number of data writings to the FLASH EEPROM 101. However the rewritable cycles ($10^{10}$ to $10^{12}$ cycles) of a ferroelectric memory 106 is more than 100,000 times as large as the rewritable cycles ($10^4$ to $10^5$ cycles) of a FLASH EEPROM 101 used as a nonvolatile memory, so that the reliability to the memory system can be improved.

It should be noted that the exemplified memory card 100 is described as a memory card removable from the host device 150, but the memory card can be built in the host device 150. In addition the FLASH EEPROM 101 and the controller 102 can be different LSIs respectively, or the FLASH EEPROM 101 and the controller 102 can compose one LSI for the memory card 100.

Second Embodiment

According to a configuration of a memory system of a second embodiment, a power supply voltage to be applied from a host device can be constant, but a clock rate for a data communication is changed based on a detected environment temperature.

Figure 7:
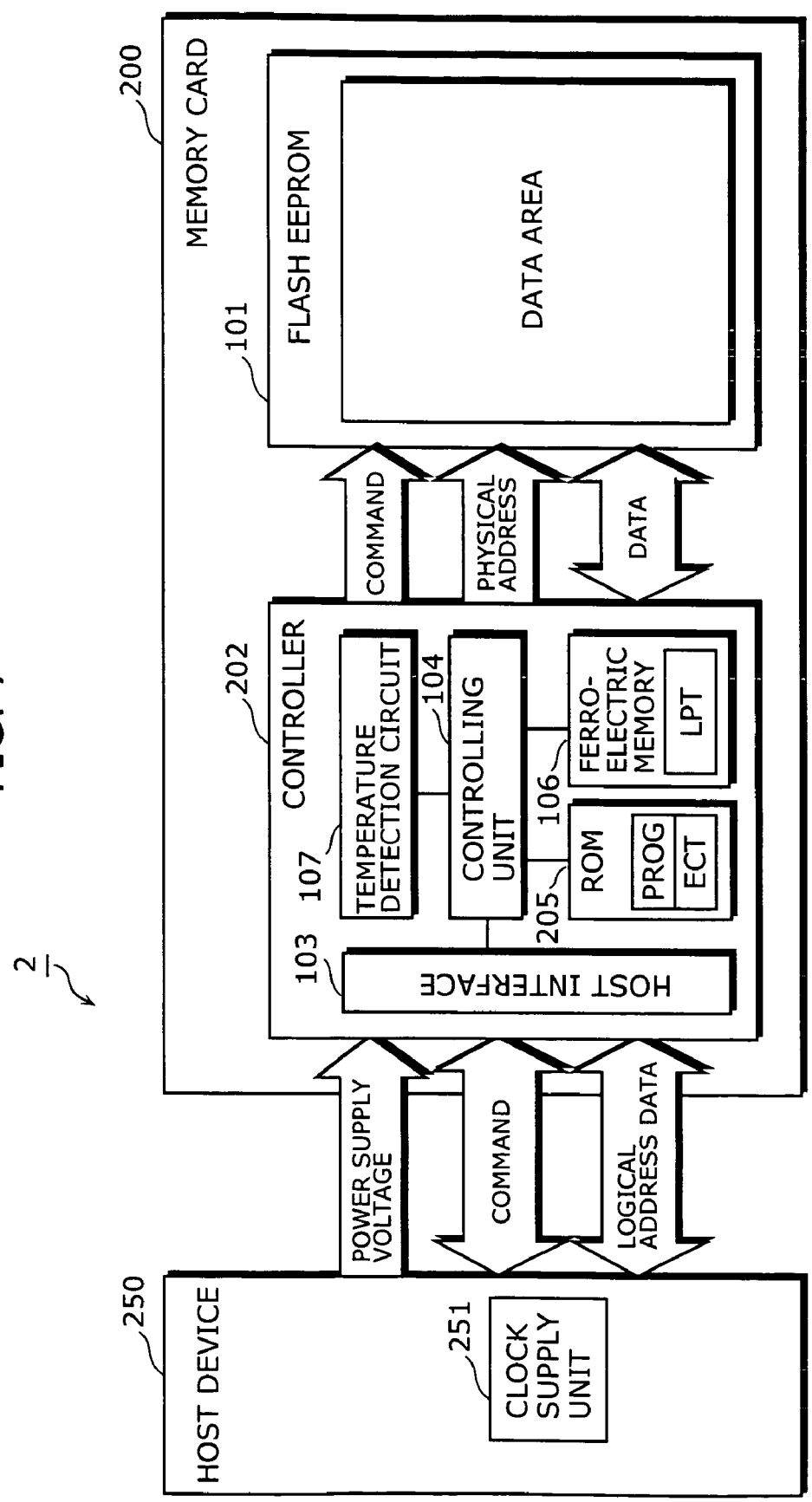
FIG. 7 is a block diagram showing a volatile memory system of a second embodiment.

FIG. 7 is a block diagram showing a configuration of the memory system 2 of the second embodiment. The memory system 2 in FIG. 7 includes a memory card 200 and a host device 250. The same units as the memory system 1 in FIG. 4 are denoted by the same numbers. The descriptions of such same units are not mentioned here, but the different points will be mainly described hereafter. The memory card 200 has a controller 202 instead of the controller 102 of the memory card 100 in FIG. 4. The controller 202 has a ROM 205 instead of the ROM 105 of the controller 102 in FIG. 4. In addition the host device 250 has a clock supply unit 251 whose transmission clock rate is variable.

The ROM 205 stores an operating program PROG of the controlling unit 104 and a table ECT indicating the relationship between the operating environment and the operating condition. The table stored in the ROM 205 is the table ECT shown in FIG. 8. The table ECT in FIG. 8 indicates the operating temperatures and the corresponding transmission clock rates. According to the table ECT, the setting of the transmission clock rate is lower when the operating temperature is decreased.

Figure 9:
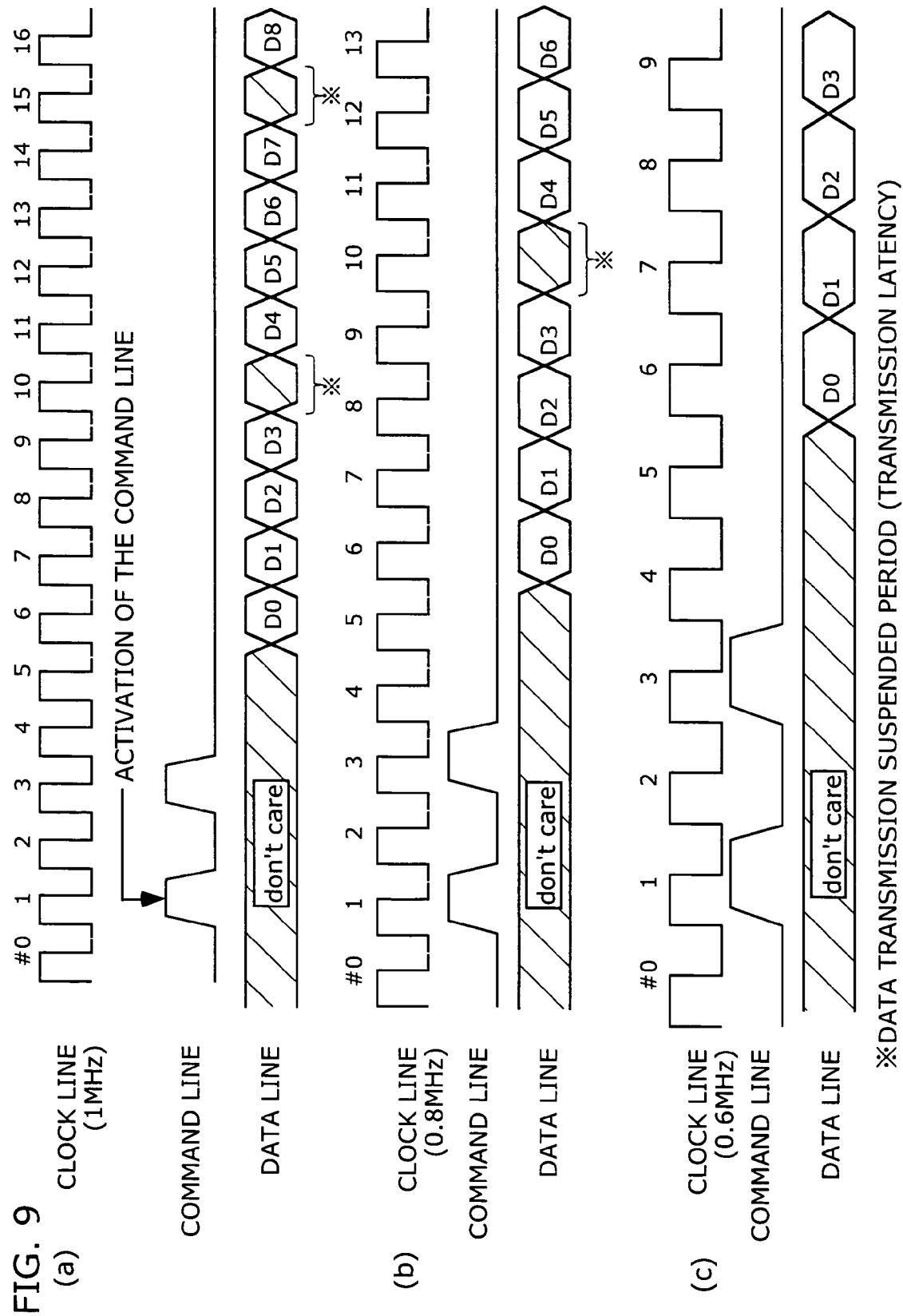
FIG. 9 is a diagram showing a communication pulse between a host device and a memory card.

FIG. 9 (a) to (c) shows timing diagrams indicating respective signals on a clock line, a command line and a data line out of the lines between the host device 250 and the memory card 200. FIG. 9 (a) shows a data writing operation in the case where the operating temperature is 10° C. and above, FIG. 9 (b) shows the data writing operation in the case of −20° C. to 10° C. for the operating temperature, and FIG. 9 (c) shows the data writing operation in the case of −40° C. to −20° C. for the operating temperature.

Pulses are applied to the command line and the data line in synchronization with the rising edge of the clock signal applied to the clock line in the host device 250. In a steady state, an electric potential of the command line is low, and when a pulse is applied as seen at the second clock (#1 in FIG. 9), the command line is activated. Subsequent to the activation of the command line, a command of two clocks is transmitted from the host device 250 to the memory card 200. In this example, signals "0, 1 " are transmitted from the host device 250 to the command line, so that the start of a data writing operation is notified. After the command is transmitted, a two-clock interval required to be ready for receiving data at the memory card 250 side elapses, and then the host device 250 transmits the logical address and the writing data to the data line. The controlling unit 104 converts the serial data received from the data line into a data format conforming to the interface of the FLASH EEPROM 101, and then writes parallel data in an empty data block in the FLASH EEPROM 101 referring to the Logical address/Physical address conversion table (LPT) in the ferroelectric 106. At the same time, the physical address of the FLASH EEPROM 101 is associated with the logical address received from the host device 250 so as to update the LPT. A sequence of these operations of the controlling unit 104 is performed during the data transmission suspended period (called as transmission latency, the 10th clock and the 15th clock in FIG. 9), which is placed after receiving every four bits data.

Figure 10:
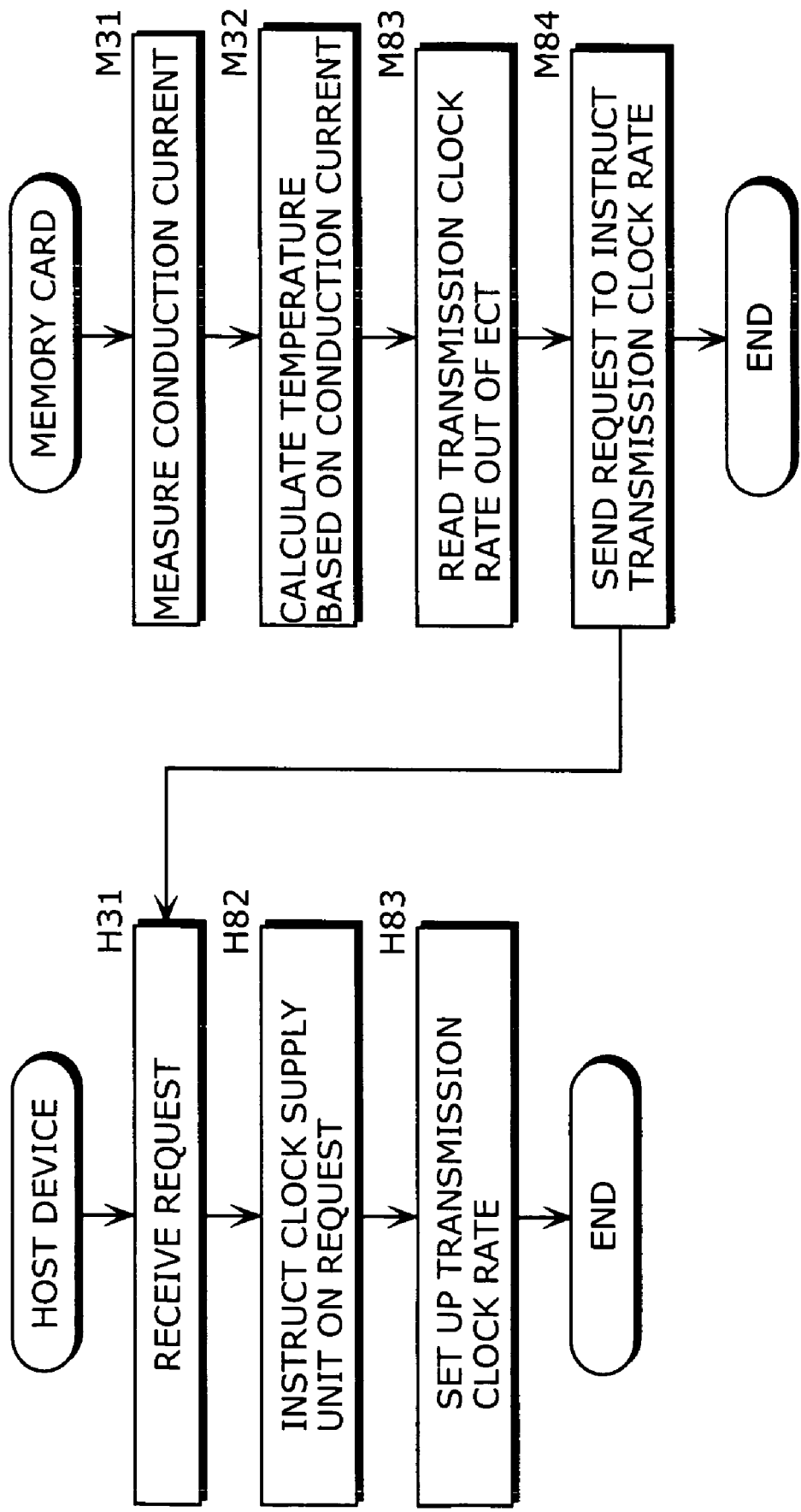
FIG. 10 is a flowchart showing the memory system operation.

FIG. 10 is a flowchart showing a processing to respond to the environment temperature in the memory card 200 and the host device 250. The flowchart has a step M83 and a step M84 instead of the step M33 and the step M34 in FIG. 6, and also a step H82 and a step H83 instead of the step H32 and the step H33. The controlling unit 104 reads a transmission clock rate corresponding to the temperature out of the table ECT (M83), and then transmits a request instructing the host device 250 on the transmission clock rate (M84). The host device 250 receives the request from the memory card 200 (H31), and instructs the clock supply unit 251 on the requested transmission clock rate (H82). For example the instruction is a parameter setting indicating the operation frequency of a PLL circuit in the clock supply unit 251. Accordingly the clock supply unit 251 sets the clock frequency to be applied to the memory card 200 (H83).

According to this, in the case where the environment temperature is more than 10° C., the transmission clock frequency is 1 MHz. As the environment temperature decreases, the transmission clock frequency decreases and the data is transmitted. Thus, as the temperature decreases, the data transmission suspended period is extended, so that the time to update the LPT in the ferroelectric memory 106 by the controlling unit 104 is also extended.

Figure 11:
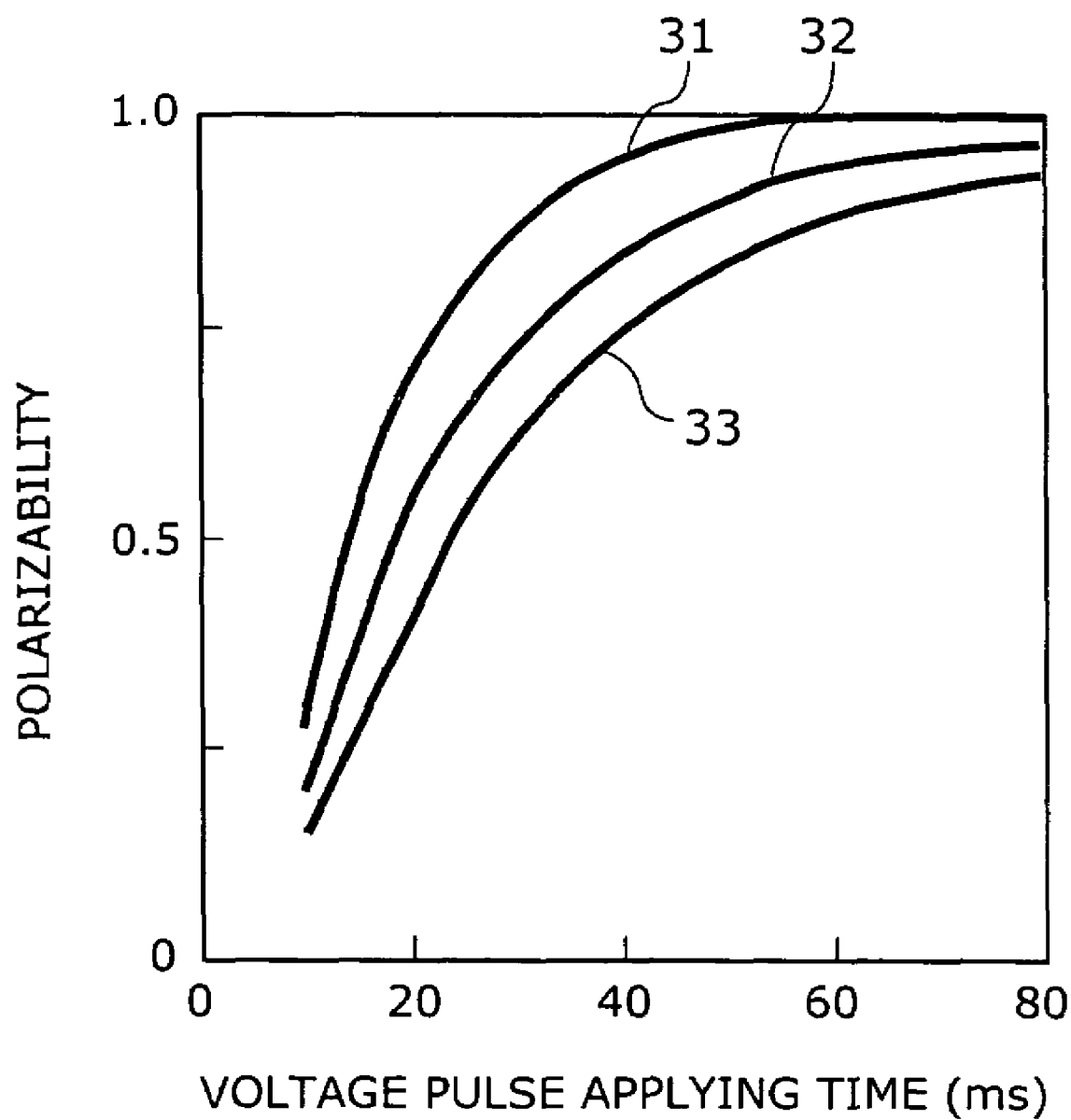
FIG. 11 is a graphical diagram showing a relationship between a voltage pulse applying time to the ferroelectric and a polarizability.

The effect is described referring to FIG. 11. FIG. 11 is a graphical diagram showing changes of polarizations of the ferroelectrics in the case where the time for applying voltage pulse to the ferroelectric capacitor composing the ferroelectric memory 106 is changed. Here, a measured polarization is 1, provided that a voltage pulse of more than 10 ms is applied under the environment temperature 20° C., (note that the polarization reaches to a saturation). A normalized value for a polarization which is obtained by applying a voltage pulse with a certain width is represented by the polarizability. FIG. 11 shows the relationship between the polarizability and the pulse width of the respective environment temperatures: 20° C. on the curve 31; 0° C. on the curve 32; and −20° C. on the curve 33. In the case where the polarizability is low, the retention characteristic deteriorates. Thus it is preferable to extend a voltage pulse width applied to the ferroelectric memory 106, so as to obtain a higher polarizability. Therefore, it is necessary to make the applying time of the voltage pulse longer under a low temperature. In the second embodiment, it is possible to extend the pulse width applied to the ferroelectric memory 106, so that the retention characteristic can be improved.

Third Embodiment

According to a configuration of a memory system of a third embodiment, a power supply voltage to be applied from a host device and a clock rate can be constant, but a transmission latency (data transmission suspended period) for a data communication is changed based on a detected environment temperature.

Figure 12:
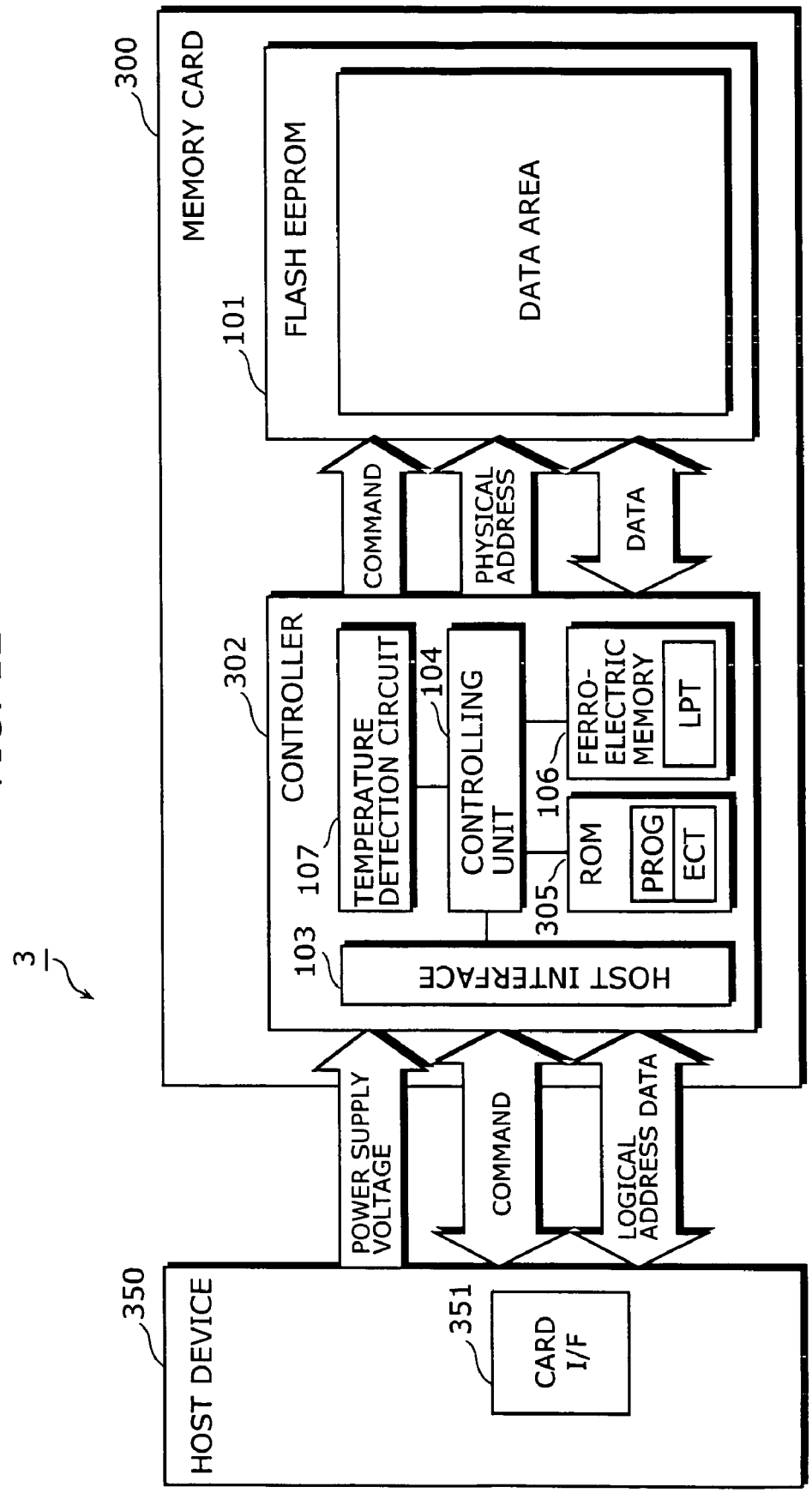
FIG. 12 is a block diagram showing a memory system.

FIG. 12 is a block diagram showing a configuration of the memory system 3 of the third embodiment. The memory system 3 of the third embodiment includes a memory card 300 and a host device 350. The same units as the memory system 1 in FIG. 4 are denoted by the same numbers. The descriptions of such same units are not mentioned here, but the different points will be mainly described hereafter. The memory card 300 has a controller 302 instead of the controller 102 of the memory card 100 in FIG. 4. The controller 302 has a ROM 305 instead of the ROM 105 of the controller 102 in FIG. 4. In addition the host device 350 has a card I/F 351 whose transmission latency is variable.

The ROM 305 stores an operating program PROG of the controller 104 and a table ECT indicating the relationship between the operating environment and the operating condition. The table stored in the ROM 305 is the table ECT shown in FIG. 13. The table ECT in FIG. 13 indicates the operating temperatures and the corresponding transmission latencies. According to the table ECT, the setting of the transmission latency is longer when the operating temperature is lower.

FIG. 14 shows timing diagrams indicating respective signals on a clock line, a command line and a data line out of the lines between the host device 350 and the memory card 300. As shown in FIG. 14, in the case where the environment temperature is not less than 10° C., the transmission clock frequency is 1 MHz, and the transmission latency is 1. As the environment temperature decreases, the transmission latency increases while the transmission clock frequency remains 1 MHz. In the case where the environment temperature is not less than 10° C., one clock of data transmission latency is interposed every 4 bits as shown in FIG. 14 ($a$), in the case where the environment temperature is between −20° C. and 10° C., two clocks of data transmission latency is interposed every 4 bits as shown in FIG. 14 ($b$), and in the case where the environment temperature is between −40° C. and −20° C., three clocks of data transmission latency is interposed every 4 bits as shown in FIG. 14 ($c$).

Figure 15:
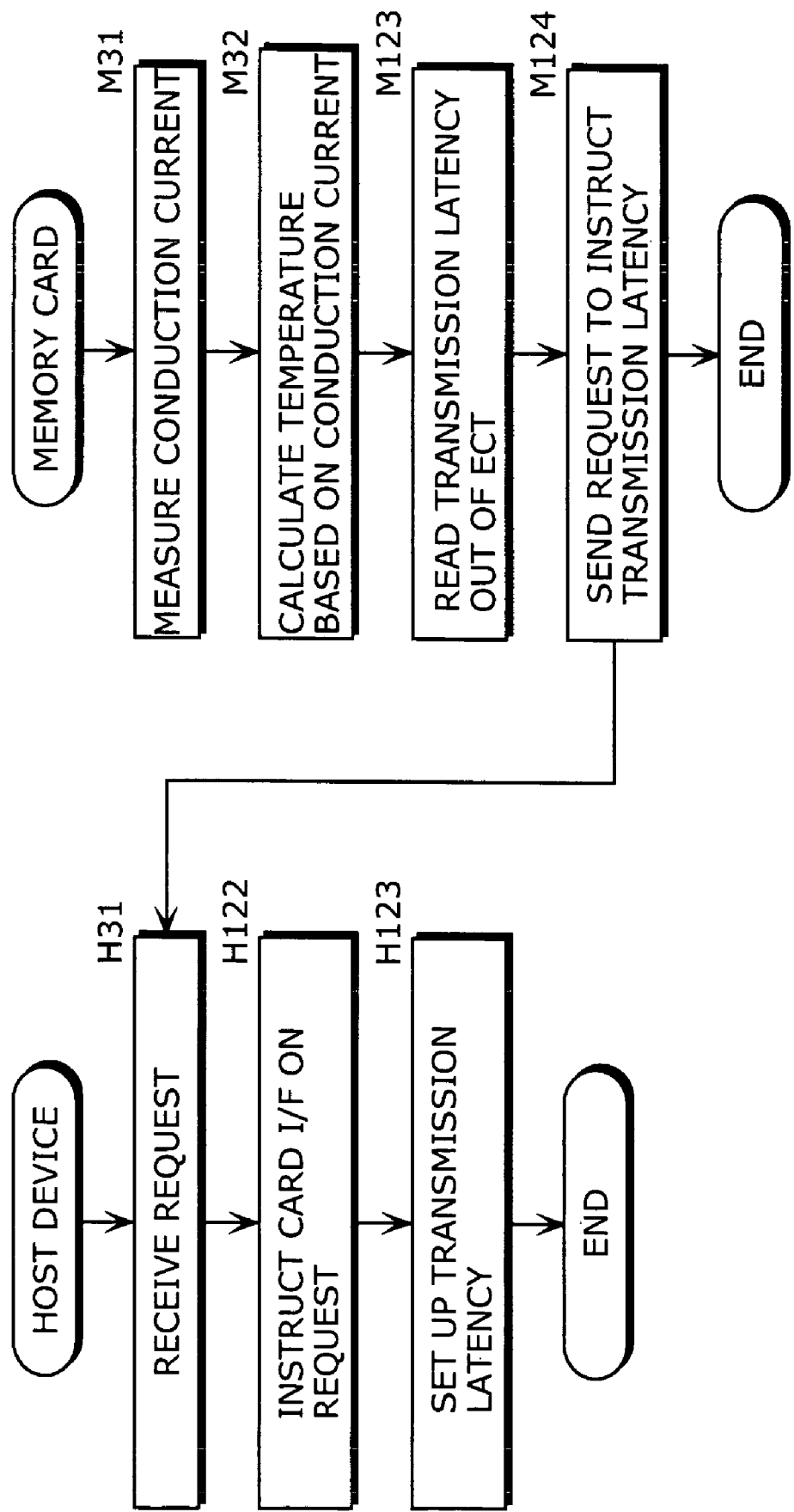
FIG. 15 is a flowchart showing a memory system operation.

FIG. 15 is a flowchart showing a processing to respond to an environment temperature in the memory card 300 and the host device 350. The flowchart has a step M123 and a step M124 instead of the step M33 and the step M34 in FIG. 6, and also a step H122 and a step H123 instead of the step H32 and the step H33. The controlling unit 104 reads a transmission latency that is, the number of clocks of the data transmission latency corresponding to the temperature out of the table ECT, (M123), and then a request indicating the transmission latency is transmitted to the host device 350 (M124). The host device 350 receives the request from the memory card 300 (H31), and then instructs the card I/F 351 on the requested transmission latency (H122). The card I/F 351 transmits data which satisfies the instructed transmission latency (H123).

Thus, it is possible to extend the time required for updating the Logical address/Physical address conversion table stored in the ferroelectric memory 106, where the updating is executed during the data transmission latency. It is also possible to improve the retention characteristic in the case where the period of voltage applying to the ferroelectric memory 106 is longer at the time of data writing operation under a low temperature. The time required for the data transmission is constant in the third embodiment in the case of a decrease in temperature, and only the data transmission latency is extended (more specifically wait cycles are increased) by the control from the controlling unit, so that a sufficient throughput of the data transmission can be achieved.

Fourth Embodiment

According to a configuration of a memory system of a fourth embodiment, a table ECT is stored in a host device not in a memory card, and temperature information is transmitted from a memory card to a host device.

Figure 16:
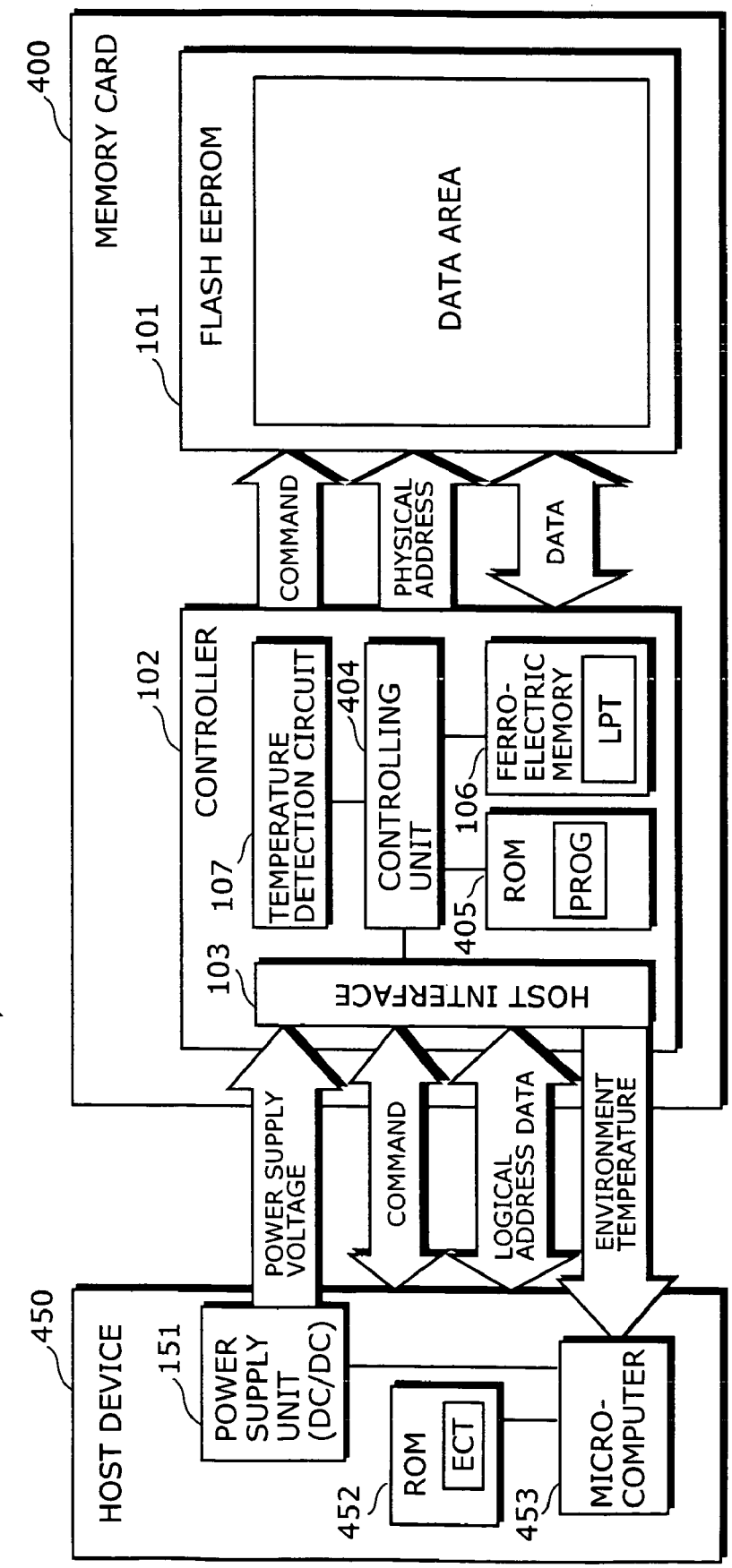
FIG. 16 is a block diagram showing a memory system of a fourth embodiment.

FIG. 16 is a block diagram showing a configuration of the memory system 4 of the fourth embodiment. The memory system 4 of the fourth embodiment includes a memory card 400 and a host device 450. The same units as the memory system 1 in FIG. 4 are denoted by the same numbers. The descriptions of such same units are not mentioned here, but the different points will be mainly described hereafter. The memory card 400 has a ROM 405 instead of the ROM 105 of the memory card 100 in FIG. 4. The host device 450 has a ROM 452 for storing the table ECT shown in FIG. 5, and a microcomputer 453.

Figure 17:
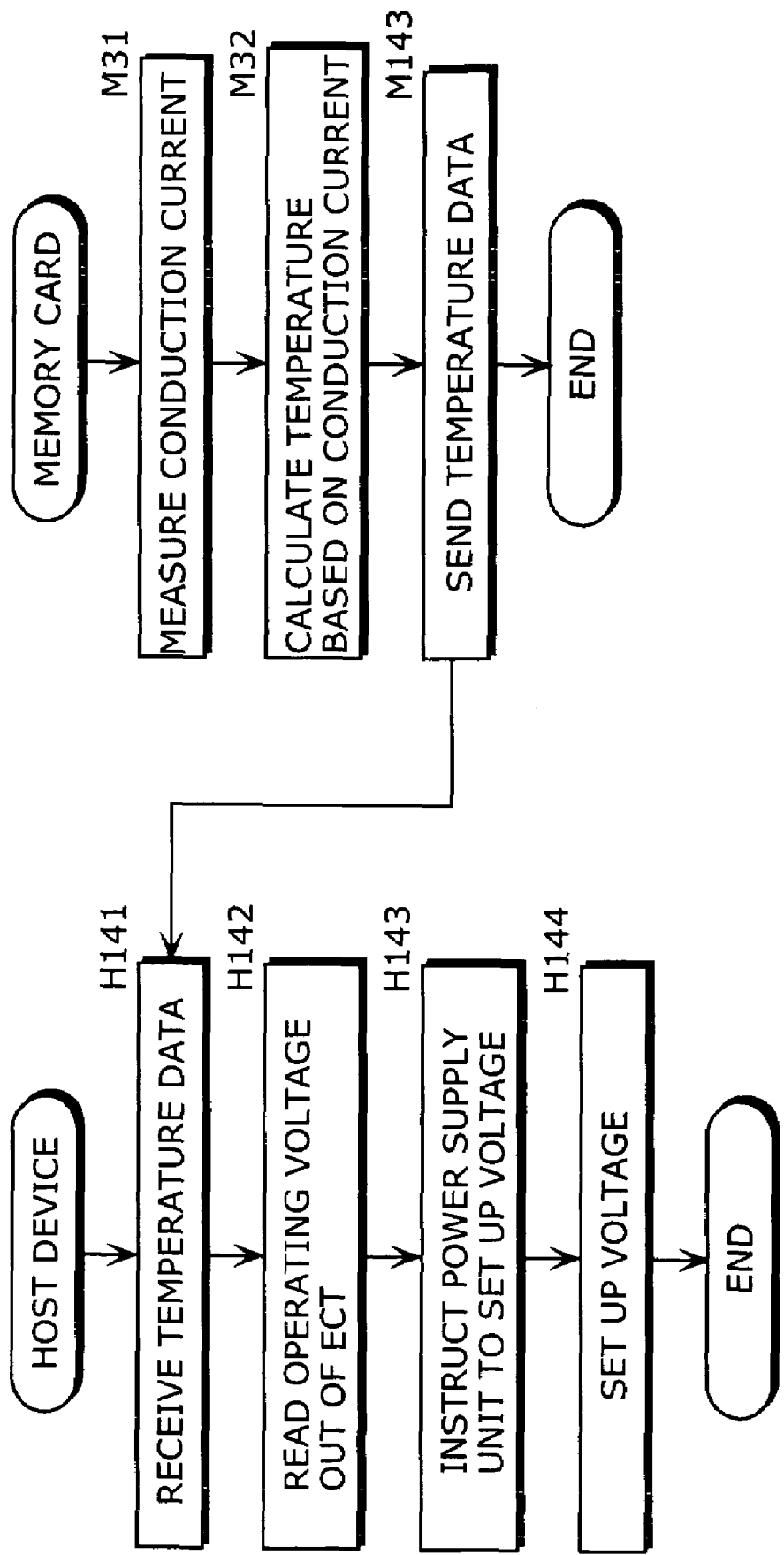
FIG. 17 is a flowchart showing the memory system operation.

FIG. 17 is a flowchart showing a processing to respond to an environment temperature in the memory card 400 and the host device 450. The memory card 400 transmits temperature data indicating a detected environment temperature to the host device 450 through a host I/F (M143). The host device 450 receives the temperature data from the memory card 400 (H141). The microcomputer 453 reads the table ECT stored in the ROM 452 out of the received temperature data (M142), and instructs the power supply unit 151 on a requested voltage setting (H143). The power supply unit 151 sets up a voltage to be applied to the memory card 400 (H144).

Thus, it is not necessary to place a table ECT in the memory card and a control circuit for calculating the operation condition based on the table ECT, so that the memory card can be downsized.

It should be noted that the microcomputer 453 may change a data transmission rate as described in the second embodiment, or may change a transmission latency as described in the third embodiment instead of changing the power supply voltage based on the temperature.

As aforesaid descriptions, the present invention is applicable to a memory card which is stable to the changes of the operation environment.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A memory system comprising:
a memory device which includes a nonvolatile memory; and
an access device which accesses said memory device,
wherein said memory device includes:
a flash Electrical Erasable Programmable Read Only Memory (EEPROM);
a ferroelectric memory configured to store information for managing an address of said flash EEPROM;
a detection unit configured to detect a temperature of said memory device;
a determination unit configured to determine an operating condition depending on the detected temperature; and
a notification unit configured to notify said access device of the determined operating condition,
wherein said access device includes:
an interface unit configured to connect to said memory device; and
a controlling unit configured to control said interface unit in accordance with the operating condition notified by said memory device.

2. The memory system according to claim 1,
wherein the operating condition represents a power supply voltage, and
said controlling unit is configured to control the power supply voltage to be applied to said memory device from said interface unit.

3. The memory system according to claim 1,
wherein the operating condition represents a data transmission rate, and
said controlling unit is configured to control the data transmission rate between said interface unit and said memory device.

4. The memory system according to claim 3,
wherein the data transmission rate represents a rate of a clock signal, and
said controlling unit is configured to control the rate of the clock signal to be applied from said interface unit to said memory device.

5. The memory system according to claim 3,
wherein the data transmission rate represents one of waiting clock counts and a transmission data latency, which is interposed between transmission data, and
said controlling unit is configured to control one of the waiting clock counts and the transmission data latency.

6. A memory system comprising:
a memory device which includes a nonvolatile memory; and
an access device which accesses said memory device,
wherein said memory device includes:
a flash Electrical Erasable Programmable Read Only Memory (EEPROM);
a ferroelectric memory configured to store information for managing an address of said flash EEPROM;
a detection unit configured to detect a temperature of said memory device; and
a notification unit configured to notify said access device of the detected temperature,
wherein said access device includes:
a determination unit configured to determine an operating condition depending on the notified temperature; and
an interface unit configured to connect to said memory device; and
a controlling unit-operable configured to control said interface unit in accordance with the determined operating condition.

7. The memory system according to claim 6,
wherein the operating condition represents a power supply voltage, and
said controlling unit is configured to control the power supply voltage to be applied to said memory device from said interface unit.

8. The memory system according to claim 6,
wherein the operating condition represents a data transmission rate, and
said controlling unit is configured to control the data transmission rate between said interface unit and said memory device.

9. The memory system according to claim 8,
wherein the data transmission rate represents a rate of a clock signal, and
said controlling unit is configured to control the rate of the clock signal to be applied from said interface unit to said memory device.

10. The memory system according to claim 8,
wherein the data transmission rate represents one of waiting clock counts and a transmission data latency, which is interposed between transmission data, and
said controlling unit is configured to control one of the waiting clock counts and the transmission data latency.

* * * * *